Sept. 20, 1966  R. J. KAVANAUGH  3,274,411
MICRO-MINIATURE MOTOR STRUCTURE
Filed April 1, 1964  2 Sheets-Sheet 1
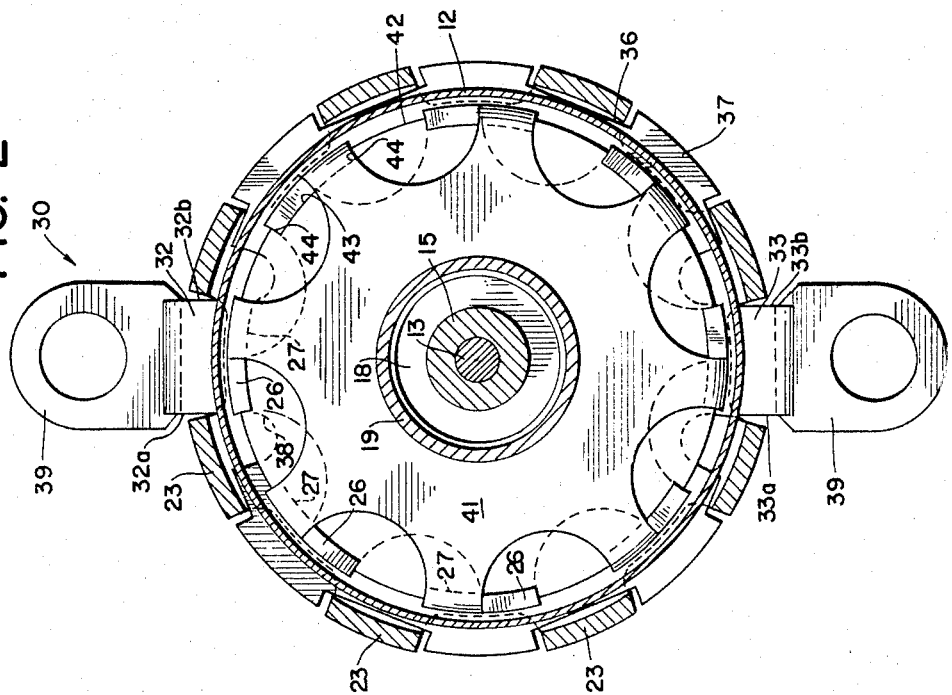
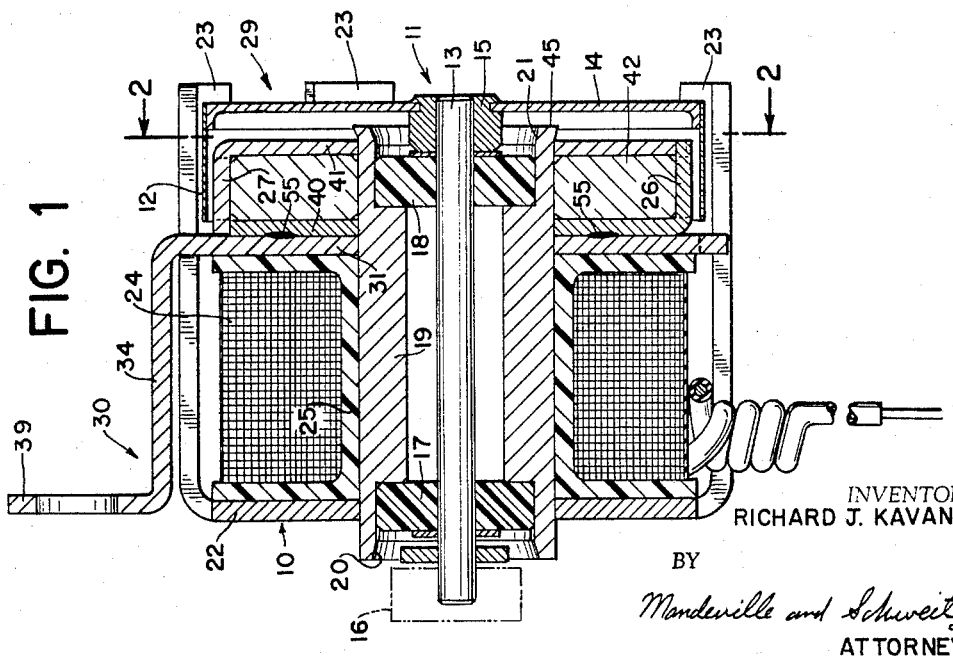
INVENTOR.
RICHARD J. KAVANAUGH
BY
Mandeville and Schweitzer
ATTORNEYS Sept. 20, 1966  R. J. KAVANAUGH  3,274,411
MICRO-MINIATURE MOTOR STRUCTURE
Filed April 1, 1964  2 Sheets-Sheet 2

INVENTOR.
RICHARD J. KAVANAUGH
BY
Mandeville and Schweitzer
ATTORNEYS

3,274,411
MICRO-MINIATURE MOTOR STRUCTURE
Richard J. Kavanaugh, Bristol, Conn., assignor to Consolidated Electronics Industries Corporation, Waterbury, Conn., a corporation of Delaware
Filed Apr. 1, 1964, Ser. No. 356,410
6 Claims. (Cl. 310—164)

The present invention relates to micro-miniature motors and more particularly to a new and improved stator structure and mounting means for a unidirectional, self-starting, hysteresis-type, synchronous motor of the general type disclosed, for example, in the A. W. Haydon, et al., Patent No. 3,113,231, granted December 3, 1963.

In accordance with the principles of the before-mentioned patent, an efficient, extremely lightweight, and unusually simplified, micro-miniature motor is provided by a unique and advantageous arrangement of inner and outer stator poles on a common core element. Specifically, the inner and outer stator poles define a cylindrical air gap, in which gap a cylindrical rotor element is synchronously driven by a rotating field developed by a coil winding. A micro-miniature motor embodying the inventions of the patent includes an outer cylindrical field ring having a predetermined number of equally spaced salient poles formed therein. Opposite each of the spaces between the outer poles and radially inwardly thereof are located an equal number of pairs of inner pole elements comprising laterally butted, shaded and unshaded pole elements projecting from a pair of oppositely disposed stator cups separated by an annular shading ring.

While this specific structure has proved to be extremely desirable and efficient in its electrical operation, its unusually small size (typically, less than one-half inch in diameter) sometimes has presented some difficulties in its mass production manufacture and in its mounting in the environments of its ultimate applications.

Accordingly, it is an object of the present invention to provide a motor having the desirable electrical attributes of the motor of the before-mentioned patent, yet lending itself to more facile assembly and more ready handling for mounting and the like after assembly. More specifically, the invention provides a mounting element or strap for a micro-miniature motor of the general type described, which strap is an integral part of the motor structure and provides for accurate alignment of the stator poles during assembly, as well as ready mountability of the completed motor.

It is a further object of the invention to provide a motor construction incorporating a mounting strap and shading ring arranged in a novel and advantageous way to facilitate the desired predetermined alignment of inner and outer stator poles (as outlined hereinabove and contemplated by the before-mentioned patent, for example) in a more precise and more accurate manner than has been heretofore attainable without resorting to painstaking and costly assembly procedures.

Briefly, a specific embodiment of the present invention comprises a motor structure incorporating a combined reference element and motor mounting strap having a plurality of stator pole lineup teeth which are adapted to precisely align the mounting strap with the outer stator pole elements of a hysteresis motor of the type described. The inner pole pieces are associated with a predetermined, prealigned reference portion of the mounting strap and are adapted to be self aligning with the outer pole elements when the strap, itself, is aligned by insertion of its lineup teeth in the spaces between the outer pole elements. The advantageous electrical flux linking relation of the elements of the motor of the patent is retained, and, indeed, is reliably achieved, while certain existing physical characteristics of the elements are utilized to advantage to enable the motor to be manufactured on a low-cost mass production basis.

In accordance with the principles of the invention, the new and improved mounting strap includes predetermined reference surfaces or "spokes" which are used to align initially the pole elements of one of the inner stator cups with the strap. The aligned stator cup may then be fixed to the strap by suitable means such as spot welds. Thereafter, the lineup teeth of the strap are employed in the alignment of the strap with the outer pole elements. The separate positive alignments of the inner and outer poles with the common reference element or mounting strap automatically and efficiently provide the proper predetermined, mutual relationship of the pole elements. As a further aspect of the invention, alignment of the inner stator cups alternatively with one or the other of the two predetermined reference surfaces determines the direction (clockwise or counterclockwise) of motor operation.

For a greater understanding of the invention, reference should be made to the following detailed description taken in conjunction with the accompanying drawings, in which FIG. 1 is an enlarged longitudinal cross-sectional view of a motor embodying the principles of the invention;

FIG. 2 is a cross-sectional view of the motor of FIG. 1 taken along line 2—2 thereof;

Figure 3:
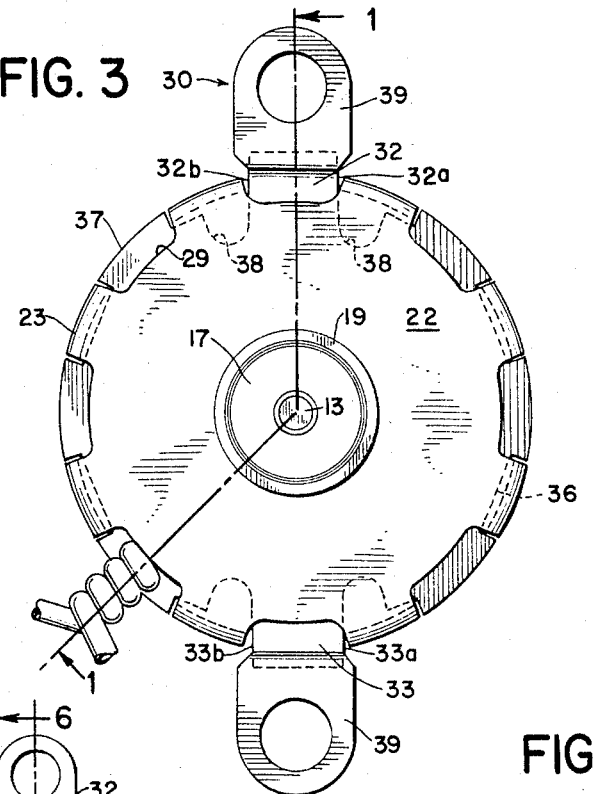
FIG. 3 is an end elevational view of the motor of FIG. 1.

With reference to FIGS. 1 and 2 of the drawings, the micro-miniature motor of the invention generally includes a new and improved stator assembly 10 and a rotor assembly 11. The illustrated rotor assembly is substantially identical to that disclosed in the above-identified Haydon et al. patent and includes an annular hysteresis rotor ring 12 supported concentrically with a rotor shaft 13 by an intermediate radial flange portion 14 fixed to the shaft 13 by a hub 15. The rotor ring 12 is fabricated from specially treated magnetic material having a high hysteresis coefficient such as hardened steel, while the flange portion 14 may be of other material.

For the purposes of clear description and not by way of limitation, hereinafter the end of the rotor shaft 13, which supports the hysteresis ring will be referred to as the rearward end while the opposite end, which may support a pinion 16 or the like (shown in phantom), will be referred to as the forward end of the motor. As shown, the rotor shaft is journaled by bearings 17, 18 for rotation within the stator structure 10.

In accordance with the principles of the invention, the stator assembly comprises a bare minimum number of parts arranged in a predetermined fashion to define concentric, cylindrical arrays of inner and outer poles, the inner poles comprising laterally butted pole elements centrally aligned with and opposite the spaces between the outer poles. Specifically, the stator structure includes a tubular core element 19 having a uniform outer diameter and a stepped bore defining bearing recesses 20, 21 at its ends. An outer cylindrical field ring 22, substantially in the shape of a cup and having its peripheral wall portions slotted to define a plurality (typically, eight) of equally spaced, rearwardly projecting poles 23, is carried by the core at its forward end. Immediately adjacent the end wall of the field ring and within the forward peripheral portions thereof, a coil or winding 24, wound on a suitable plastic bobbin 25 is received closely over the tubular core 19.

In accordance with the principles of the aforementioned Haydon et al. invention and as set forth in detail in the beforementioned patent, a plurality of inner, unshaded pole elements 26 laterally butt a plurality of inner shaded pole elements 27 to form a plurality of inner pole elements pairs, which are substantially symmetrically disposed with respect to the field ring slots, indicated at 29. Thus, the teachings of the Haydon et al. patent require that each of the abutted, inner pole element pairs 26, 27 be centrally located opposite the slots 29 defined by adjacent outer pole elements 23. Accordingly, and as shown clearly in FIG. 2, the center lines of the butted inner pole element pairs 26, 27 are coincident with the center lines of each of the slots in the field ring.

As shown in FIGS. 1 and 2, the unshaded pole elements 26 are formed in rearwardly extending peripheral portions of a first inner stator cup 40, while the shaded pole elements 27 are similarly formed in forwardly extending peripheral portions of a second inner stator cup 41. The two cups are mutually spaced by an annular shading ring 42 which, in accordance with the invention, includes holding slots 43 at its periphery. The slots 43 are substantially equal to the width of the butted pole element pairs 26, 27 and maintain the pole elements in the desired, laterally butted relation as shown in FIG. 2. The outer diameter of the ring 42 is such that the ring does not project beyond the periphery of the inner pole elements, yet it does intersect the general cylindrical envelope of the inner pole elements. The shading ring 42 causes time delay in the magnetic flux variations of the pole elements 27 relative to the flux variations in the pole elements 26. This determines the direction of rotation of the motor in accordance with well known principles. More specifically and in accordance with the invention, the direction of rotation of the motor will be either clockwise or counterclockwise, depending up the relative positions of the pole elements 26, 27. Thus, for example, with the unshaded pole elements "leading" the shaded pole elements 27 in the counterclockwise direction, as viewed in FIG. 2, the motor direction will be counterclockwise. Conversely, if the unshaded elements 26 were reversed to "lead" the shaded pole elements 27 in the clockwise direction, the operation of the motor would be reversed and would be clockwise.

Heretofore, the desired precision alignment of the inner and outer poles was difficult to achieve without time consuming and costly assembly procedures. Assembly and alignment heretofore has been accomplished using visual faculties, which, of course, vary among assembly operators. Moreover, these visual methods did not reliably assure uniform alignments from motor to motor. In accordance with the principles of the present invention, however, the desired alignment of the inner pole element pairs 26, 27 with the outer poles 23 may now be accomplished with facility, accuracy, and uniformity.

Figure 4:
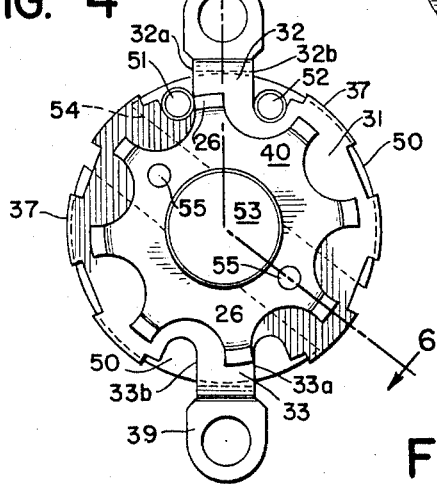
FIG. 4 is an end view of a mounting strap embodying the principles of the invention, including a stator cup aligned therewith for clockwise motor operation, and an assembly fixture therefor.
Figure 5:
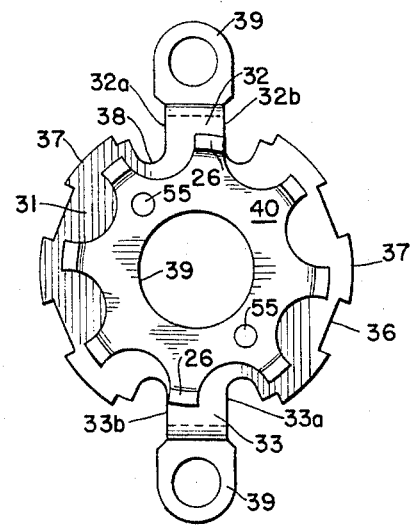
FIG. 5 is an end view of a mounting strap embodying the principles of the invention and including a stator cup aligned therewith for counterclockwise motor operation.

As an important aspect of the invention, a reference element 30 is included in the motor assembly, which element intersects the cylindrical envelopes of the inner and outer pole elements and is physically aligned in a positive manner with both sets of poles. As a further aspect of the invention, the reference element 30 is in the nature of a mounting strap and has portions projecting externally of the motor to facilitate its ultimate mounting. More specifically and as shown in FIGS. 4 and 5, the strap 30 includes a central disc-like portion 31 having an outer diameter approximately equal to that of the field ring 22. At predetermined circumferential areas of the disc-like portion, the strap includes radially extending reference portions or "spokes" 32, 33, terminating at arcuate alignment surfaces 38. Each reference portion has a predetermined "inner" reference width substantially equal to the width of pole element pairs 26, 27. The edges 32a, 32b, 33a, 33b, of the reference portions constitute reference surfaces which intersect the cylindrical envelope of the inner poles.

The strap also includes mounting arms 34, 35 (FIG. 6) which advantageously project radially outward and axially forward of the field ring 22 terminating at integral mounting tab portions 39. In the illustrated arrangement, the mounting tabs 39 are formed in a plane generally parallel to and aligned with the plane of the central portion of the field ring 22.

At the periphery of the disc-like portion 31 of the mounting strap and between the reference portions 32, 33, a plurality of lineup teeth 37 are formed. In accordance with the invention, the lineup teeth and the reference portions define notches 36 equal in number to the number of outer pole elements 23 and equiangularly spaced about the strap body. The edges of the lineup teeth constitute reference surfaces which intersect the cylindrical envelope of the outer poles 23, and the width of the notches is such as to receive the outer pole elements.

It should be appreciated that the structure described hereinabove is intended primarily for use in motors of extremely small size, so-called micro-miniature motors, and accordingly, the various elements require precise alignment in assembly to achieve the desired beneficial operating characteristics. For example, a typical motor, constructed in accordance with the principles of the invention, has an axial length of approximately .310 inch and a diameter of approximately .375 inch, exclusive of the thickness of the mounting strap, which may be advantageously fabricated from a .012 inch sheet of stainless steel or other substantially non-magnetic material. In such a motor, the butted pole element pairs 26, 27 may have a combined width of about 0.068 inch at a diameter of about 0.308 inch. The outer pole elements 23 may have a width of about 0.060 inch at a diameter of about 0.367 inch. The shading ring may have a thickness of about 0.040 inch, a diameter of about 0.303 inch, and notches about 0.011 inch deep and about 0.073 inch wide. The mounting strap 30 may have a diameter of about 0.360 inch, notches about 0.064 inch wide for the reception of the outer stator pole elements, and recesses 38 for receiving the locating pins 51, 52 spaced apart about 0.068 inch in the circle of the inner pole element pairs.

Figure 6:
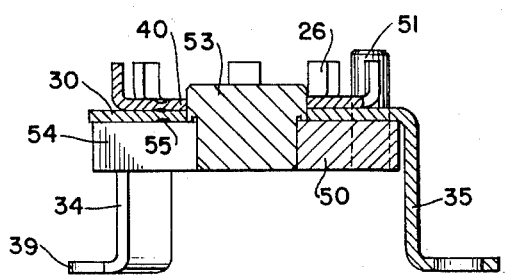
FIG. 6 is a cross-sectional view taken along line 6—6 of FIG. 4.

Assembly of the new and improved stator structure with the inner and outer poles in their predetermined, desired relation may be accomplished with expedience and facility, in accordance with the principles of the invention, through the utilization of a special assembly fixture 50 shown in FIGS. 4 and 6. The fixture 50 includes a pair of locating pins 51, 52 spaced thereon to straddle and engage the opposed surfaces of the reference portions 32 or 33 at the alignment surfaces 38. A hub 53 projects from the fixture 50 and has a cylindrical guide portion of a diameter substantially equal to the uniform diameters of the central bores of the strap 30 and the non-shaded stator cup 40 (FIG. 6). Advantageously, the fixture 50 is provided with an access channel 54 to permit the placement of spot welding electrodes (not shown) in contact with the aligned stator cup 40 and mounting strap 30 for permanently securing the two.

For a desired direction of rotation, counterclockwise, for example, and in accordance with the invention, the edges of the pole elements 26 of inner stator cup 40 are aligned flush with the edges 32a, 33a (see FIG. 4). Placement of the strap 30 on the fixture with the pins 51, 52 abutting the reference element 32 enables the stator cup 40 to be placed over the hub 53 and rotated until its pole elements are flush with the reference edges 32a, 33a. This is determined by the abutment of a pole element 26 with the pin 51, as shown in FIG. 4. With the desired alignment achieved, it is made permanent by a pair of spot welds, indicated at 55. For an opposite direction of rotation (clockwise) and in accordance with one specific aspect of the invention, the pole elements 26 may alternatively be aligned flush with the reference edges 32b, 33b, by abutment of one of the pole elements 26 against the pin 52. An embodiment of such a structure is shown in FIG. 5.

In the assembly of the stator structure 10, the field ring 22 is applied over the forward end of the core element 19 after the coil bobbin 25 has been placed thereon. The mounting strap 30, with the inner stator cup affixed thereto with its pole elements flush with the reference edges 32a and 33a (as shown in FIG. 4) is then placed over the core element 19 with the lineup teeth 37 being received in the field ring slots 29.

With the mounting strap 30 positively and accurately aligned with the field ring 22, the slotted shading ring 42 is placed over the core element 19 adjacent the inner stator cup 40. In accordance with the principles of the invention, the outer stator cup 41 is then placed over the core element 19, with the edges of its forwardly projecting pole elements 27 held laterally butting the rearwardly projecting pole elements 26 by the sides 44 of the shading ring slots 43, as shown in FIG. 2. The fixed alignment of the pole elements 26 with the mounting strap 30, results in the pole elements 26, themselves, serving as accurately aligned reference elements for the pole elements 27, which are arranged to abut the elements 26 in accordance with the principles of the before-mentioned A. W. Haydon et al. Patent No. 3,113,231.

Since the forwardly extending pole elements 27 are equiangularly or symmetrically spaced about the periphery of the outer stator cup 41, they will be automatically aligned in their proper centrally disposed, nonoverlapping relationship with the symmetrically arrayed outer pole elements by their abutment with the previously aligned inner pole elements 26. With the stator cup 41 thus aligned with the stator cup 40 and the laterally butted pole elements held by the slotted shading ring 42, the rearwardly extending free end 45 of the core element 19 is flared outwardly to lock the various elements in their predetermined assembled relationships.

The motor may then be completed by pressing the bearings 17, 18 into the core element 19 and journaling the rotor assembly 11 therein. It will be appreciated that the completed micro-miniature motor may subsequently be handled and mounted in its intended ultimate environments with relative ease by virtue of the new and improved mounting strap 30.

A micro-miniature motor embodying the principles of the invention may be manufactured with a bare minimum of parts and on an extremely economical basis. More importantly, the new motor structure, including the unique combined mounting strap and aligning element and slotted shading ring ensures uniformity among mass produced motors and unusually great accuracy of alignment of stator poles in each motor resulting in highly efficient operation.

It should be understood that the specific embodiment herein illustrated and described is intended to be representative only, as certain changes may be made therein without departing from the clear teachings of the disclosure. Accordingly, reference should be made to the following appended claims in determining the full scope of the invention.

I claim:
1. In a minature hysteresis-type synchronous motor having a cylindrical core, a rotor, a magnet winding mounted on and surrounding the front portion of the core, an outer cylindrical field ring enclosing said magnet in flux linking relation with said magnet winding and having rearwardly axially projecting integral outer pole elements arrayed in a first cylindrical configuration, said outer pole elements defining a predetermined number of symmetrically arrayed spaces therebetween, a stator subassembly comprising:
(a) a mounting strap having a central disc-like portion and at least one radially extending reference portion associated therewith,
(b) a first inner pole piece having a plurality of symmetrically arrayed rearwardly projecting inner pole elements,
(c) a second inner pole piece having a plurality of symmertcially arrayed forwardly projecting inner pole elements,
(d) said inner pole elements being laterally butted to define a plurality of inner pole element pairs equal in number to the spaces between said outer poles.
(e) said disc-like portion having a plurality of lineup teeth each having an outer width substantially equal to the width of the spaces between the outer pole elements in said cylindrical field ring,
(f) said lineup teeth and said reference portion being equiangularly spaced about the periphery of said disc-like portion to coincide with said spaces between the outer pole elements,
(g) said reference portion being a width substantially equal to the combined width of said inner pole element pairs,
(h) said disc-like portion having a central bore therein,
(i) one of said inner pole pieces being affixed to said mounting strap with at least one of its pole elements flush with an edge of said reference portion,
(j) said strap being supported on said core with said inner pole elements in flux linking relation with said winding and with said lineup teeth in the spaces between said outer pole elements,
(k) whereby said inner butted pole elements are aligned in a second cylindrical configuration symmetrically opposite the spaces between said outer pole elements,
2. The motor of claim 1, in which
(a) said reference portion projects radially outward of the peripheral outline of the motor as defined by the field ring.
3. The motor of claim 1, which includes
(a) two radially extending reference portions,
(b) said reference portions are diametrically opposed on the periphery of said disc-like portion.
4. The motor of claim 3, in which
(a) said lineup teeth and said reference portions are equal in umber to the number of spaces between said outer pole elements.
5. The motor of claim 1, which includes
(a) an annular shading ring,
(b) said ring having a plurality of equiangularly arrayed slots defined at its periphery,
(c) said slots being substantially equal in width to the width of said inner pole element pairs,
(d) said pole element pairs being received in said slots whereby said slots maintain said pole element pairs in said laterally butted relation.
6. In a stator structure for a miniature motor having a core element, an outer field ring including a cylindrical array of symmetrically disposed outer pole elements, inner stator cups including axially forwardly and rearwardly extending inner pole elements, said inner pole elements being arranged to form pole element pairs and being arrayed in predetermined relation to the spaces, between said outer pole elements and to each other, the improvement including:
(a) a reference element having a central body portion,
(b) said body portion having an opening therein received over said core element,
(c) said reference element having an inner reference portion intersecting the cylindrical envelope of said inner pole elements,
(d) said inner reference portion having an edge aligned flushly with a side edge of one of the pole elements of said first stator cups and in juxtaposition with said inner reference element,
(e) said reference element having an outer reference portion of a width substantially equal to the width of the spaces between said outer pole elements, (f) said outer reference portion intersecting the cylindrical envelope of said outer pole elements and having its edge portions engaging the edges of adjacent outer pole elements, (g) an annular shading ring having a plurality of notches defined at its peripheries, (h) the edges of said notches engaging the outer edge of the pole elements of said first and second stator cups which form said pole element pairs, (i) said pole element pairs being received in said notches and engaged by the edges of said notches in a manner whereby said notch edges control the predetermined lateral pairing of said inner pole elements of said stator cups, (j) said alignments of said inner and outer pole elements with said reference element and said inner pole elements in said notches of said shading ring thereby effecting a predetermined, desired, mutual alignment of said inner and outer pole elements.

References Cited by the Examiner

UNITED STATES PATENTS

| | | | |
|---|---|---|---|
| 2,237,960 | 9/1941 | Hansen et al. | 310—172 X |
| 2,323,035 | 6/1943 | Hansen et al. | 310—172 X |
| 2,552,315 | 5/1961 | Gottlieb et al. | 310—172 |
| 2,804,557 | 8/1957 | Roters | 310—164 |
| 2,951,957 | 9/1960 | Eigeman | 310—172 X |
| 2,981,855 | 4/1961 | Van Lieshout et al. | 310—172 X |
| 3,092,743 | 6/1963 | Van Utt et al. | 310—102 |
| 3,113,231 | 12/1963 | Haydon et al. | 310—163 |

ORIS L. RADER, *Primary Examiner.*

G. SIMMONS, *Assistant Examiner.*